United States Patent [19]

Nadkarni

[11] Patent Number: 5,261,955
[45] Date of Patent: Nov. 16, 1993

[54] COLORING ALUMINUM FLAKES

[75] Inventor: Sadashiv K. Nadkarni, Lexington, Mass.

[73] Assignee: Alcan International Limited, Montreal, Canada

[21] Appl. No.: 887,543

[22] Filed: May 22, 1992

[51] Int. Cl.$^5$ .............................................. C09C 1/64
[52] U.S. Cl. ..................................... 106/404; 106/450
[58] Field of Search ............... 106/403, 404, 449, 450

[56] References Cited

U.S. PATENT DOCUMENTS 4,158,074  6/1989  Uchiyama et al. ................. 427/214
4,978,394 12/1990  Ostertag et al. ..................... 106/404

Primary Examiner—Mark L. Bell
Assistant Examiner—Chris Gallo
Attorney, Agent, or Firm—Cooper & Dunham

[57] ABSTRACT

A process for coloring metal flakes by dispersing the flakes in an inorganic metal oxide sol to coat the flakes with the sol, dispersing the sol-coated flakes in a solution of an inorganic metal compound in a solvent, and thereafter heating the flakes for producing thereon a sol-gel coating that imparts to the flakes a visible color different from the color of the metal flakes when uncoated. The sol, the compound and the solvent are mutually selected to form the color-providing sol-gel coating on the metal flakes upon heating. Aluminum flake pigments are colored in this manner using an aqueous alkaline zirconia sol and a solution of cobalt nitrate in ethanol and/or water or a solution of iron nitrate in ethanol (followed, in the case of iron nitrate, by a treatment with ammonium hydroxide in ethanol). The steps of successively dispersing the flakes in the sol and solution may be repeated to intensify the produced color.

25 Claims, 2 Drawing Sheets

COLORING ALUMINUM FLAKES

BACKGROUND OF THE INVENTION

This invention relates to processes for coloring metal flakes of the type employed as pigments in paints or like compositions, and to the colored flake products so produced. In an important specific sense, to which detailed reference will be made below for purposes of illustration, the invention is particularly concerned with the coloring of aluminum flakes. The term "aluminum" is used herein to refer to aluminum metal and aluminum-based alloys.

In present-day commercial practice, aluminum flake pigment is made by grinding (e.g., ball milling) aluminum foil or aluminum powder in an organic vehicle, and in the presence of a small amount of a milling lubricant such as a fatty acid, to produce flake-shaped aluminum particles typically having a thickness of about 1 to 2 microns and a diameter of about 10 to 100 microns. The pigment is usually sold as a paste of these flakes in mineral oil.

Aluminum flake pigments are widely employed in organic solvent-based paints, for example paints for coating furniture, to impart metallic luster to the produced coatings or finishes. Although the natural metal color of the flakes is satisfactory for some applications, it is frequently desired to produce a finish of a different color. In such cases it has heretofore been customary to use organic pigments; but the colors thus provided tend to fade away over time, especially after prolonged exposure to sunlight.

For this reason, it would be desirable to color aluminum (and other metal) flakes by applying an inorganic coating thereto. Colors produced by inorganic coatings are superior to organic colors in stability, remaining satisfactorily unfaded for much longer periods under equivalent exposure conditions. The coating of metal flakes with inorganic colors, however, is attended with other difficulties, such as agglomeration, adhesion, and adverse chemical reactions.

U.S. Pat. No. 4,978,394 describes the coating of aluminum flakes with titanium compounds, including $TiO_2$, by decomposition of $TiCl_4$ in the presence of water vapor and nitrogen in a fluidized bed of the flakes, to impart interference colors to the flakes. Control of the produced color by variation in coating thickness and/or by other, subsequent treatments (including doping or overcoating with oxides of other metals, such as iron or chromium) is also described. The procedure appears to require a period of several hours and to be capable of performance only on a batch basis.

SUMMARY OF THE INVENTION

An object of the present invention is to provide new and improved processes for coloring metal flakes with inorganic coatings, affording enhanced operational simplicity, economy, and rapidity of production, and capable of being performed in a continuous manner.

A further object is to provide new and improved processes for inorganically coloring aluminum flake pigments.

Yet another object is to provide new and improved, inorganically colored flake aluminum pigments produced by such processes.

To these and other ends, the present invention in a first aspect broadly contemplates the provision of a process for coloring metal flakes, comprising the steps of dispersing metal flakes in an inorganic metal oxide sol to coat the flakes with the sol, dispersing the sol-coated flakes in a solution of an inorganic metal compound in a solvent, and thereafter heating the flakes for producing thereon a color-providing sol-gel coating, the sol, the compound and the solvent being mutually selected to form this sol-gel coating on the metal flakes upon heating of the flakes as aforesaid. The proportions or concentrations of metal oxide and inorganic metal compound used are those which are effective, in combination, to produce the color-providing sol-gel coating on the flakes.

The term "color-providing sol-gel coating" as used herein designates a coating that imparts to the flakes a visible different color, i.e., a color different from that of the metal flakes before coating.

In this process, the metal compound solution acts as a gelation agent for the sol, and the dispersal of the sol-coated flakes in the solution constitutes a gelation step. Conveniently or preferably, each immersion (dispersal of flakes in sol and solution) is followed by removal of excess liquid from the flakes (e.g. by filtration). The heating step, which follows the gelation step, is performed at a temperature and for a time such that the metal compound of the gelation agent is decomposed and the coatings on the flakes are converted to nondispersible gels. The procedure is advantageously simple, expeditious and economical, and can readily be performed as a continuous operation.

The visible colors imparted to the flakes, by the sol-gel coatings established on the flakes by the process of the invention, are believed attributable to interference effects, possibly in combination with absorption effects; that is to say, the colors result from elimination of particular wavelengths by interference between light reflected from the surface of the coating and light reflected from the substrate (flake) surface, and perhaps also from absorption of light of specific wavelengths. These colors, being imparted to the flakes by inorganic coatings, are desirably stable and long-lasting even after extended exposure to light.

In a second aspect, the invention contemplates the provision of a process for coloring aluminum flakes, comprising the successive steps of establishing, on each of a multiplicity of aluminum flakes, a coating of an aqueous alkaline zirconia sol, exposing the sol-coated flakes to a solution of an inorganic metal compound in a solvent, and thereafter heating the flakes for producing thereon a color-providing sol-gel coating, the compound and the solvent being mutually selected to form the color-providing sol-gel coating on the sol-coated aluminum flakes upon heating of the flakes as aforesaid. Further in accordance with the invention, these steps are advantageously performed by the procedure of the first aspect of the invention, i.e., by successively dispersing the flakes in the sol and in the solution (followed by heating), with filtering after each dispersal step to remove excess liquid.

As a particular feature of the invention, in specific embodiments thereof, the metal compound is a nitrate, preferably selected from the class consisting of cobalt nitrate and iron nitrate, and the solvent (in the solution of that compound) is ethanol and/or water, ethanol being preferred in at least many instances because the resultant sol-gel coatings are smoother than if the solvent comprises or includes a major proportion of water. Examples of metal compound solutions found effective for achieving the objects of the invention include a solution of cobalt nitrate in ethanol, preferably at a concentration of about 50 to about 200 grams per liter (about 5-20 wt. %); a solution of cobalt nitrate in a solvent comprising water, alone or in mixture with ethanol, preferably at a concentration of about 100 to about 200 grams per liter (about 10-20 wt. %); and a solution of iron nitrate in ethanol, preferably at a concentration of about 200 to about 400 grams per liter (about 20-40 wt. %). When the iron nitrate solution is used, treatment of the flakes therewith is preferably followed by a step of exposing the flakes to a solution of ammonium hydroxide in ethanol, before performance of the heating step.

It is currently preferred to provide the aqueous alkaline zirconia sol at a concentration of about 2 to about 30 grams per liter, to supply the aluminum flakes in water-dispersible condition, and to perform the heating step by heating the flakes to a temperature above 200° C. for a period of about 10 to about 20 minutes.

To enhance the intensity of the produced color, following the initial successive exposure of the flakes to the sol and the metal compound solution, the flakes may be subjected to repeated performance of those successive steps, either before or (in the case of procedures employing the iron nitrate solution) after the heating step.

In additional aspects, the invention contemplates the provision of colored metal flakes produced by the processes described above.

Further features and advantages of the invention will be apparent from the detailed description hereinbelow set forth, together with the accompanying drawings.

DETAILED DESCRIPTION

Figure 1:
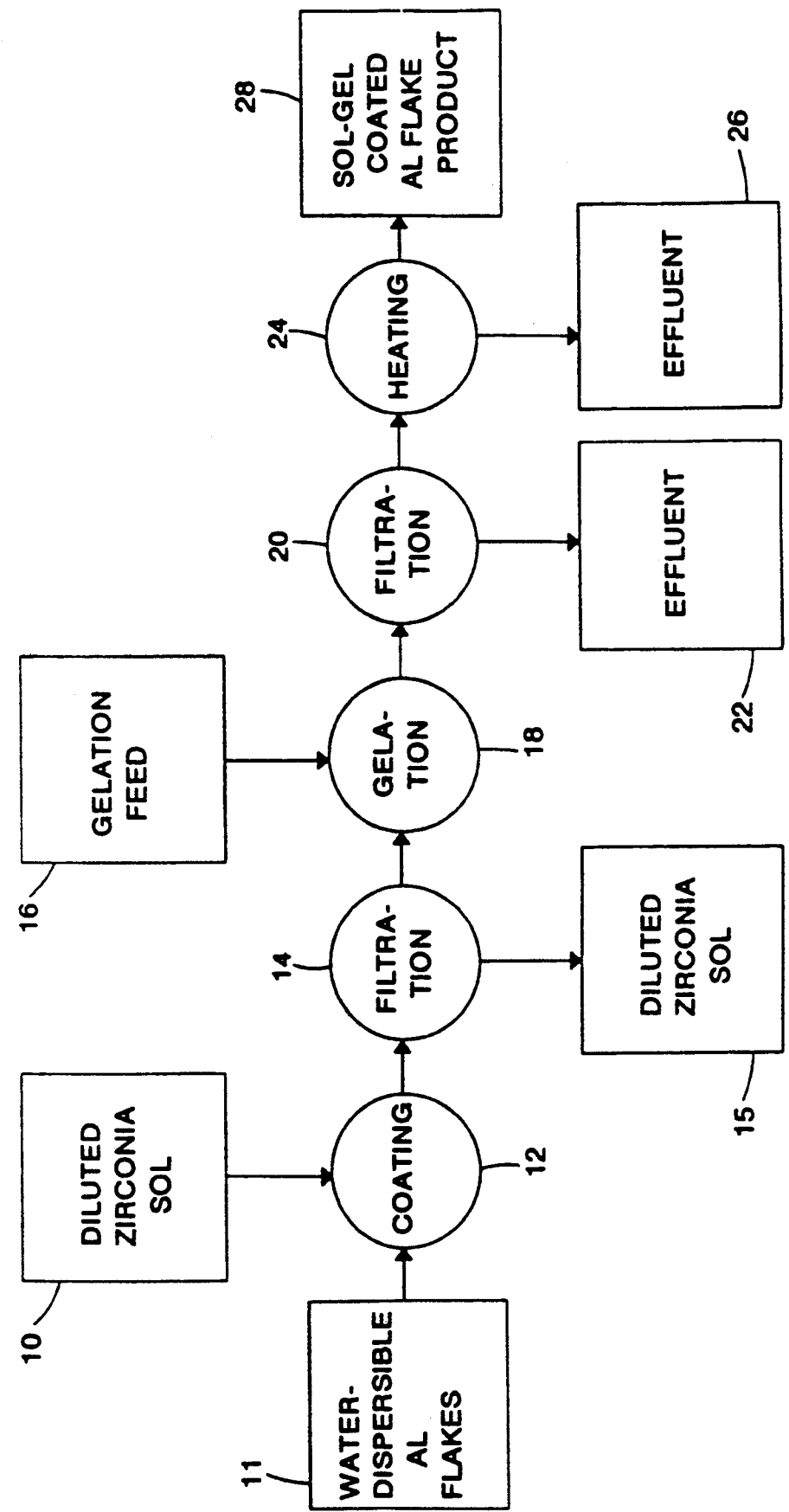
FIG. 1 is a flow diagram of the process of the present invention in illustrative embodiments thereof.

The process of the invention will be particularly described as embodied in procedures for coloring flake aluminum pigment particles (having the usual flake pigment particle shape and dimensions as mentioned above) so as to enable their use as colored metallic pigments in paints or the like, e.g. for coating furniture. In substance, the invention involves establishing, over the entire surface of each flake pigment particle, an inorganic color-providing coating, employing a sol-gel technique, viz., a technique of coating each flake particle with a layer of a metal oxide sol and then gelling the sol.

In all the embodiments of the invention herein described, the sol employed is an aqueous alkaline zirconia sol, viz. a colloidal dispersion of zirconia ($ZrO_2$) in an aqueous alkaline vehicle. Other sols that have been tested for this purpose, including titania sols, acidic zirconia sols, and ceria sols, have not given satisfactory results, because the resultant color on the flakes was non-uniform and/or the surfaces of the treated flake product were undesirably rough. An aqueous alkaline zirconia sol is not dispersible in ethanol and can therefore be gelled using ethanolic solutions. A suitable sol of this type for use in the practice of the present process is a commercially available aqueous alkaline zirconia sol diluted with deionized water to a concentration of about 2 to about 30 g/l (preferably about 10 to about 20 g/l).

The first (sol coating) step of the process of the invention, in the several preferred embodiments herein described for coloring aluminum flakes, comprises dispersing the flakes in the diluted sol to establish a coating of the sol on the flake surfaces. Aluminum flake pigments as commonly sold in dispersion in mineral oil must be pretreated to render them wettable by an aqueous sol; suitable treatments for this purpose are well-known in the art and accordingly need not be described in detail. Water-dispersible aluminum flakes, however, are also commercially available, and are preferred, from the standpoint of convenience, for use in the present process.

The sol coating step of the method is preferably performed by immersing the aluminum flakes in the diluted sol, with stirring (to disperse the flakes in the sol) e.g. at a temperature of about 23° C. for a period of about 5 minutes, followed by removal of excess sol from the flakes by filtration, to leave a solvent-damp residue (wet cake) of sol-coated flakes.

The gelation step of the present process, in the described embodiments, is performed by dispersing the sol-coated flakes in a gelation feed comprising a solution of a metal nitrate in ethanol and/or water, again with stirring e.g. at a temperature of about 23° C. for a period of about 5 minutes. Ethanol is generally preferred as the solvent; since the aqueous alkaline zirconia sol is not dispersible in ethanol, it is believed that the use of a gelation feed having an ethanol solvent leaves the previously established sol coating fully adherent to the flakes. However, in some instances the gelation feed solvent may comprise water (with or without ethanol), although much smoother surfaces are obtained in the final product when the gelation step is carried out in ethanol. The metal nitrate acts as a dopant; cobalt nitrate and iron nitrate have been found suitable as such dopants. Illustrative or preferred concentration ranges for the nitrate in the gelation feed are about 0.5 to about 20 wt. % in the case of cobalt nitrate and about 20 to about 40 wt. % in the case of iron nitrate.

After gelation, a second filtration step is performed to remove excess solvent, nitrate and gelled zirconia, once more providing the flakes in the form of a wet cake or solvent-damp residue. Following this second filtration step, and depending on such factors as the nature of the gelation feed and the color or desired intensity of color to be produced, the flakes may be either directly subjected to the final heating step of the process or given one or more other treatments as further described below.

The final heating of the flakes is conveniently or preferably performed in shallow trays, at a temperature and for a time sufficient to decompose the metal nitrate of the gelation feed and form the corresponding oxide, whereupon the flakes develop a color different from that of the uncoated flake metal. For instance, with a gelation feed of 5-20 wt. % cobalt nitrate in ethanol (and with preheating of the flakes at about 100° C. to drive off ethanol following the second filtration), the nitrate decomposes, and the flakes develop a golden color, after about 10 to 15 minutes of final heating to a temperature above 200° C. (preferably above 250° C.), although it is currently preferred to employ higher temperatures (300°-350° C.) and somewhat longer times (15-20 minutes) for this final heating step.

If desired, successive coatings may be built up on the flakes by reimmersing them in the sol of the coating step after completion of the gelation step, i.e., by performance of two or more successive complete sol coating-gelation cycles with moderate-temperature (e.g. 180°–190° C.) drying after each, prior to the final heating step. Alternatively, for example when iron nitrate is used as the dopant in the gelation feed, the flakes may be repeatedly subjected to the complete sol coating-gelation-final heating cycle; and, again in the latter instance, after the second filtration step (following gelation) the flakes may be reacted with a solution of ammonium hydroxide in ethanol, and filtered to remove excess reaction liquid, before the heating step.

After final heating, the flakes have a visible color different from that of the original, uncoated flakes, rendering them suitable for use as a colored pigment. The product of the method, in the above-described embodiments, is a non-agglomerated aluminum flake pigment wherein each individual flake has an inorganic color-providing sol-gel coating which is substantially uniform over the entire flake. The coating does not adversely affect the luster of the flakes. Thus, the product pigment is highly satisfactory for use in paints for coating furniture or the like to provide finishes having both color and metallic luster.

Several specific embodiments of the process of the invention are illustrated in flow diagram format in the drawings, to which reference will now be made.

In a first embodiment, employing the procedure shown in FIG. 1, the aqueous alkaline zirconia sol commercially available from Magnesium Elektron Inc. under the trade name "Bacote 20", having an initial concentration of 200 g/l, is added to deionized water to dilute the sol to a concentration of 10–20 g/l and stirred for five minutes at 23° C., to provide the diluted alkaline zirconia sol represented at box 10. A quantity of the water-dispersible aluminum flake pigment sold under the trade name "Toyal Flake PH 1440 C" (represented at box 11 is dispersed in the diluted zirconia sol 10 by stirring with a magnetic stirrer at 23° C. for five minutes, to perform a coating step 12, i.e., to coat the surfaces of the flakes with the sol. The flake-sol mixture is then filtered, using suction (step 14), to provide the sol-coated flakes as a wet cake or solvent-damp residue, with removal (as effluent) of diluted zirconia sol 15 at a concentration of 10–20 g/l.

The gelation feed 16 is prepared by dissolving reagent grade cobalt nitrate, $Co(NO_3)_2 \cdot 6H_2O$, in ethanol (commercial grade: 90% EtOH, 5% MeOH, 5% $H_2O$) to provide a concentration of 5–20 wt. % cobalt nitrate in the ethanol. Gelation (step 18) is then performed by adding the solvent-damp sol-coated flakes from filtration step 14 to the gelation feed 16 with stirring at 23° C. for five minutes. This step is followed by a second filtration (step 20), again using suction and resulting in a solvent-damp residue of the coated flakes, with an effluent 22 of ethanol, water, gelled zirconia, and cobalt nitrate.

After removal of this effluent, the damp flakes are heated to 300°–350° C. for 15–20 minutes in shallow trays (step 24), driving off a gaseous effluent 26 of ethanol, water, and $NO_x$. At this temperature, the nitrate decomposes, rendering the flakes bright golden in color. The intensity of the color varies depending on the concentration of cobalt nitrate in ethanol in the gelation feed.

The product 28 of this process is thus a gold colored zirconia sol-gel coated aluminum flake, suitable for use as a gold colored pigment in a paint or the like, and having a metallic luster.

A very similar gold color is obtained by substituting iron nitrate for cobalt nitrate in the gelation feed, but the color obtained with cobalt nitrate is deeper and more uniform.

In a second embodiment of the process of the invention, again following the procedure represented in FIG. 1, steps 12 and 14 are performed with the same diluted zirconia sol 10 and aluminum flakes 11 as in the first embodiment described above, to provide, at the completion of filtration step 14, sol-coated aluminum flakes in the form of solvent-damp residue. The gel feed 16, in this second embodiment, is a 10–20 wt. % solution of cobalt nitrate (the same reagent grade as in the first embodiment) in deionized water or in a 75:25 mixture of water and the aforementioned commercial grade ethanol. That is to say, the gelation feed differs from that of the first embodiment in that the liquid vehicle (solvent) is water with or without a proportion of ethanol.

In this second embodiment, the gelation step 18 is performed by adding the sol-coated flake to the aqueous cobalt-nitrate gel feed with stirring at 23° C. for five minutes. Thereafter, the flakes are filtered (step 20, performed as in the first embodiment) and heated (step 24) at 350° C. for 10–15 minutes, whereupon they turn light green in color. The product 28 is thus a green colored sol-gel coated aluminum flake, again suitable for use as a pigment.

Figure 2:
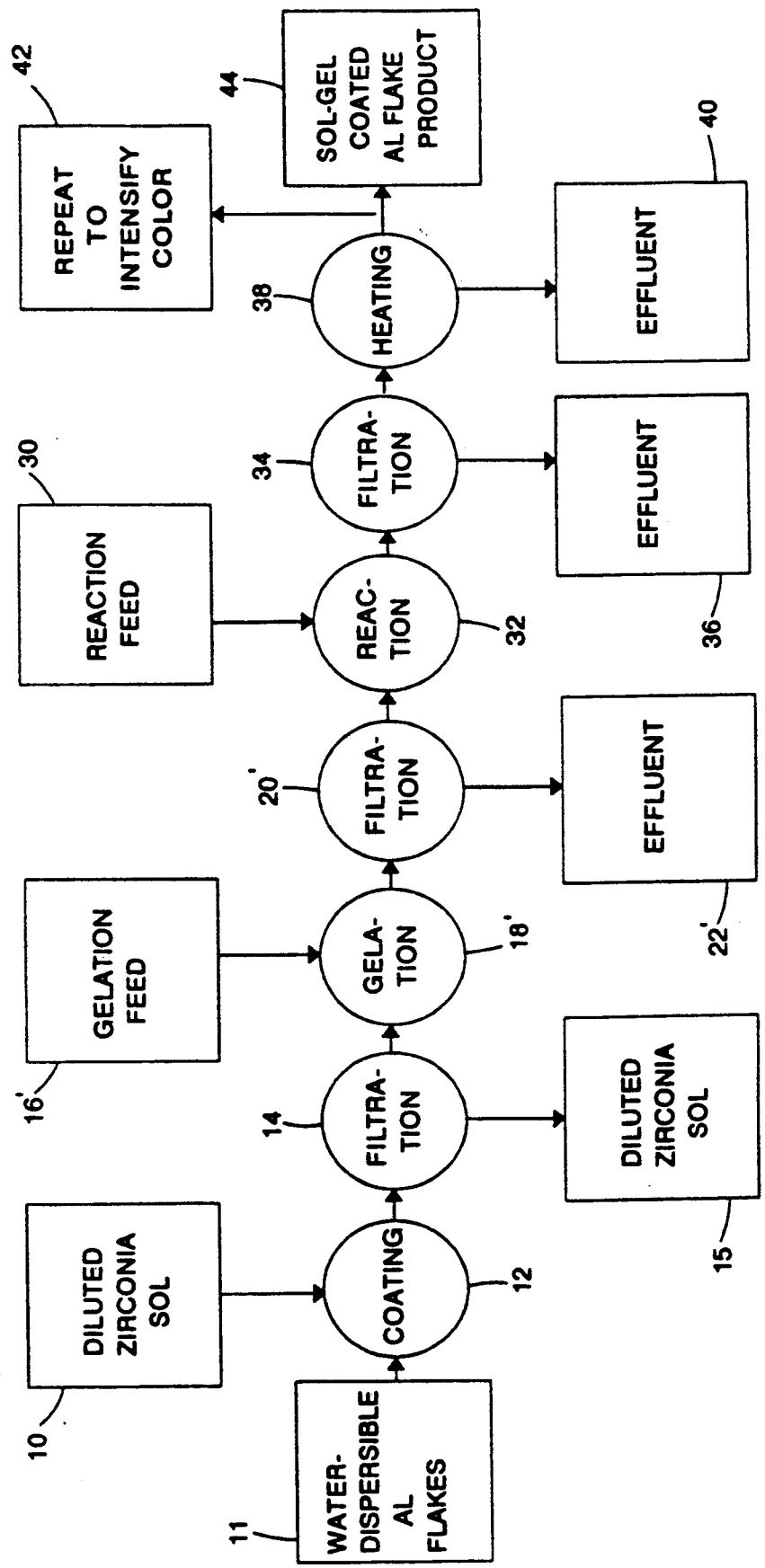
FIG. 2 is a flow diagram of another embodiment of the process of the invention.

FIG. 2 shows a third embodiment of the process of the invention, in which, again, the starting materials (sol 10 and flake 11) and the steps 12 and 14 are identical to the corresponding materials and steps in the first two embodiments described above. The gelation feed 16', however, is a solution of reagent grade iron nitrate, $Fe(NO_3)_3 \cdot 9H_2O$, in the aforementioned commercial grade ethanol at a concentration of 20–40 wt. % iron nitrate. The gelation step 18' is performed in the same manner as that of the above-described embodiments, viz. by adding the flakes from filtration step 14 to the gelation feed with stirring at 23° C. for five minutes, followed by a filtration step 20' which leaves the flakes in the form of a solvent-damp residue, the effluent 22' in this instance being constituted of ethanol, water, iron nitrate and gelled zirconia.

From filtration step 20', the solvent-damp flakes are added to a reaction feed 30 of ethanol (commercial grade as described above) containing 10 wt. % of ammonium hydroxide, and are reacted therewith (step 32) by stirring at 28° C. for five minutes.

The reaction step 32 is followed by a third filtration step 34, procedurally the same as steps 14 and 20', and resulting in a solvent-damp residue of flakes with an effluent 36 of ethanol and ammonium hydroxide.

Following the filtration step 34, the solvent-damp flakes are reheated (step 38) in shallow trays for 10–15 minutes at 350°, driving off as effluent 40 ethanol, water, and $NO_x$.

The entire procedure may be repeated as indicated at 42 to apply a second coat to intensify the color imparted to the flakes. The product 44 is a red colored sol-gel coated aluminum flake. The step 32 (reaction with ammonium hydroxide) is necessary to obtain the red color; if this step is omitted from the FIG. 2 embodiment using iron nitrate in the gelation feed, the produced treated flakes are golden in color.

The following specific examples further illustrate the process and products of the invention:

EXAMPLE I

A number of tests were conducted, generally in accordance with the several specific embodiments described above with reference to the drawings. Process conditions and results are summarized in the following table, which also indicates the flow diagram ("FIG. No.") showing the steps performed in each test. In all cases the aluminum flakes were "Toyal Flake PH 1440 C" water-dispersible aluminum flakes; the sol was "Bacote 20" aqueous alkaline $ZrO_2$ sol diluted (to the concentration indicated in the table) with deionized water; the ethanol ("Et" in the table) was commercial grade, 90% EtOH, 5% MeOH, 5% $H_2O$; the cobalt nitrate ("Co" in the table) was reagent grade $Co(NO_3)_2$ $6H_2O$; and the iron nitrate ("Fe" in the table) was reagent grade $Fe(NO_3)_3$ $9H_2O$. Where more than one coating cycle (sol coating/filtration/gelation/filtration) was performed, the treated flakes were heated after each cycle; the presence of a temperature in the second and/or third columns under the heading "Heating Temp. °C." in the table indicates that such number of repeated coating cycles were performed, the temperature being that to which the flakes were heated after the designated (1 st, 2 nd, or 3 rd) coating cycle. The abbreviation "Et/$H_2O$" in the "Solvent" column of the table indicates that the solvent was a 50:50 mixture of water and commercial grade ethanol; the "wt. %" column gives the concentration of nitrate in the gelation feed.

TABLE

| FIG. No. | Sol Conc. g/l | Gelation Feed Nitrate | Solvent | wt % | Heating Temp. °C. 1st | 2nd | 3rd | Final Color |
|---|---|---|---|---|---|---|---|---|
| 1 | 15 | Co | Et | 20 | 350 | no | no | gold |
| 1 | 30 | Co | Et | 25 | 350 | no | no | gold |
| 1 | 15 | Co | Et | 15 | 350 | no | no | gold |
| 1 | 15 | Co | Et/$H_2O$ | 20 | 350 | no | no | green |
| 2* | 15 | Fe | Et | 30 | 350 | 350 | no | red |
| 3 | 15 | Co | Et | 2.0 | 195 | 195 | 350 | none |
| 3 | 15 | Co | Et | 0.5 | 195 | 195 | 350 | none |
| X | 15 | none | Et | none | 195 | 195 | 195 | none |

*in this test the flakes were immersed and stirred in 10% ammonium hydroxide in ethanol following gelation with the iron nitrate - ethanol gelation feed and before heating "Final Color" means the final color of the flakes after the process was completed. The last test (identified by "X" under "FIG. No.") was a comparative test in which no nitrate was present in the gelation feed.

EXAMPLE II

A quantity of the "Toyal Flake PH 1440 C" water-dispersible aluminum flakes were dispersed in "Bacote 20" aqueous alkaline zirconia sol diluted with deionized water to a concentration or 15 g/l. The sol-coated flakes were immersed in a 20 wt. % solution (gelation feed) of cobalt nitrate in ethanol and thereafter filtered. The filtered flakes were then heated at a temperature above 250° C. for 20 minutes. Once the nitrate decomposed, the flakes turned gold in color.

The test was repeated with different sol and nitrate concentrations. When the concentration of cobalt nitrate was reduced to 10 wt. % and then further to 5 wt. %, the final gold color of the flakes became lighter and lighter. The intensity of the color did not increase (beyond that produced with 20 wt. % cobalt nitrate) when the cobalt nitrate concentration was increased to 30 wt. %. However, a slight increase of intensity was observed when the sol concentration was increased to 30 g/l and the cobalt nitrate concentration was 25 wt. %.

Without limitation of the invention to any particular theory, it is currently conjectured that when the cobalt nitrate decomposes to form the corresponding oxide in the final heating step, a part of the oxide may be reacting with aluminum of the flakes to form a cobalt coating which causes the flake color to appear golden, though this coating by itself does not have a golden color.

For purposes of comparison, a quantity of the "Toyal Flake PH 1440 C" water-dispersible aluminum flakes was dispersed in a 20 wt. % solution of cobalt nitrate in ethanol; excess solution was filtered off; and the nitrate-treated flakes were heated to a temperature of 350° C. for about 20 minutes. The nitrate decomposed at this temperature, generating brownish nitric oxide films. After heating, the flakes were practically colorless except at a few spots.

As a further comparative test, a quantity of the "Toyal Flake PH 1440 C" water-dispersible aluminum flakes were coated with a ceria sol at a concentration of 20 g/l. The sol-coated flakes were immersed in a 20 wt. % solution of cobalt nitrate in ethanol; excess solution was filtered off; and the nitrate-treated flakes were heated to a temperature of 350° C. for 20 minutes. Part of the flakes became golden but another part of the flakes did not develop the deep golden color. Similar results were obtained when the test was repeated using titania sol or acidic zirconia sol in place of the ceria sol.

The unsatisfactory results of the comparative tests are believed attributable to the dispersibility of the ceria, titania and acidic zirconia sols in ethanol, and the consequent failure of the cobalt nitrate to adhere adequately to the flakes.

It is to be understood that the invention is not limited to the procedures and embodiments hereinabove specifically set forth, but may be carried out in other ways without departure from its spirit.

What is claimed is:

1. A process for coloring metal flakes, comprising the steps of:
   (a) dispersing metal flakes in an aqueous alkaline zirconia sol to coat the flakes with the sol,
   (b) dispersing the sol-coated flakes in a solution of an inorganic metal compound in a solvent, and
   (c) thereafter heating the flakes for producing thereon a color-providing sol-gel coating;
   said sol, said compound and said solvent being mutually selected to form said color-providing sol-gel coating on the metal flakes upon heating of the flakes as aforesaid.

2. A process according to claim 1, wherein said flakes are aluminum flakes and are supplied for step (a) in water-dispersible condition.

3. A process according to claim 2, wherein said metal compound is a nitrate.

4. A process according to claim 3, wherein said solvent is ethanol.

5. A process according to claim 3, wherein said nitrate is cobalt nitrate or iron nitrate.

6. A process according to claim 5, wherein said nitrate is cobalt nitrate and said solvent is selected from the group consisting of ethanol, water, and mixtures thereof.

7. A process according to claim 6, wherein the flakes after step (b) are again subjected to steps (a) and (b) in succession before performance of step (c).

8. A process according to claim 5, wherein said nitrate is iron nitrate and said solvent is ethanol, and further including the step of dispersing the flakes, between steps (b) and (c), in a solution of ammonium hydroxide in ethanol.

9. A process according to claim 8, wherein after step (c) the flakes are again subjected in succession to step (a), step (b), the step of dispersion in a solution of ammonium hydroxide in ethanol, and step (c).

10. A process for coloring aluminum flakes, comprising the successive steps of:
   (a) establishing, on each of a multiplicity of aluminum flakes, a coating of an aqueous alkaline zirconia sol,
   (b) exposing the sol-coated flakes to a solution of an inorganic metal compound in a solvent, and
   (c) thereafter heating the flakes for producing thereon a color-providing sol-gel coating;
said compound and said solvent being mutually selected to form said color-providing sol-gel coating on said sol-coated aluminum flakes upon heating of the flakes as aforesaid.

11. A process according to claim 10, wherein said solution is a solution of cobalt nitrate in ethanol.

12. A process according to claim 11, wherein said sol is at a concentration of about 2 to about 30 grams per liter.

13. A process according to claim 11, wherein the cobalt nitrate solution is at a concentration of about 50 to about 200 grams per liter.

14. A process according to claim 11, wherein the heating step is performed by heating the flakes to a temperature above 200° C. for a period of about 10 to about 20 minutes.

15. A process according to claim 11, wherein step (a) is performed by supplying the flakes in water-dispersible condition, dispersing them in the sol to establish the coating of sol thereon, and filtering to remove excess sol, the sol being at a concentration of about 10 to about 20 grams per liter; wherein step (b) is performed by dispersing the sol-coated and filtered flakes in said cobalt nitrate solution and thereafter filtering the flakes to remove excess liquid, said solution being at a concentration of about 50 to about 200 grams per liter; wherein step (c) is performed by heating the flakes to a temperature above 250° C. for a period of about 10 to about 20 minutes for establishing thereon a sol-gel coating imparting a gold color to the flakes.

16. A process according to claim 11, wherein, after performance of step (b), the flakes are heat-dried and again subjected to steps (a) and (b) in succession prior to performance of step (c).

17. A process according to claim 10, wherein said solution is a solution of cobalt nitrate in a solvent comprising water at a concentration of between about 100 and about 200 grams per liter.

18. A process according to claim 17, wherein said solvent further comprises ethanol in mixture with the water.

19. A process for coloring aluminum flakes, comprising the successive steps of:
   (a) establishing, on each of a multiplicity of aluminum flakes, a coating of an aqueous alkaline zirconia sol,
   (b) exposing the sol-coated flakes to a solution of iron nitrate in ethanol at a concentration of between about 200 and about 400 grams per liter,
   (c) exposing the flakes to a solution of ammonium hydroxide in ethanol, and
   (d) heating the flakes for producing thereon a sol-gel coating.

20. A process according to claim 19, wherein, after performance of step (d), the flakes are again exposed in succession to steps (a), (b), (c) and (d) in succession.

21. A colored aluminum flake product produced by the method of claim 10.

22. A colored aluminum flake product produced by the method of claim 11.

23. A colored aluminum flake product produced by the method of claim 16.

24. A colored aluminum flake product produced by the method of claim 17.

25. A colored aluminum flake product produced by the method of claim 19.

* * * * *